United States Patent Office 3,354,242
Patented Nov. 21, 1967

3,354,242
PROCESS OF MAKING ORGANIC
PHOSPHORUS POLYMERS
Morris L. Nielsen, Dayton, Ohio, assignor to Monsanto Research Corporation, St. Louis, Mo., a corporation of Delaware
No Drawing. Filed Dec. 24, 1964, Ser. No. 421,073
7 Claims. (Cl. 260—930)

ABSTRACT OF THE DISCLOSURE

A process whereby a compound of the formula

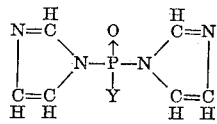

(Y being aryl or O-aryl) reacts with dihydric phenols through elimination of imidazole to yield polyarylenephosphonates or -phosphates.

---

The present invention relates to organic phosphorus polymers and more particularly provides a new and valuable method for the preparation of polyarylenephosphates and polyarylenephosphonates.

In prior art (see, e.g., Zenftman and Wright, British Plastics 25, 374 (1952), and Korshak, J. Polymer Science 31. 319 (1958)) polymers having repeating units such as

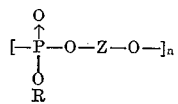

and

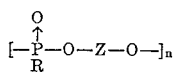

where R is aryl and Z is arylene have been described. In the past these polymers have been prepared by one of several methods, such as, (1) the reaction of an aryloxyphosphoryl dichloride with a dihydric phenol according to the equation

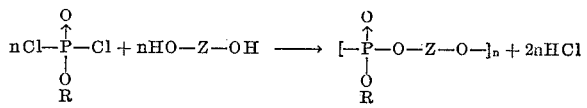

or (2) the reaction of a phosphonic acid with a dihydric phenol according to the equation

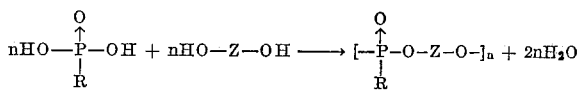

The latter reaction, because of the low reactivity of the phosphonic acids, is seldom used. The former procedure involves the formation of by-product hydrogen chloride, which causes difficulties in that it is corrosive to metal equipment, is toxic to personnel, and, in combination with traces of atmospheric moisture, can cause degradation of the desired polymers.

Now I have found that the polyarylene phosphorus polymers are readily prepared without encounter of the aforesaid difficulties by reaction between (1) a phosphorus compound of the formula

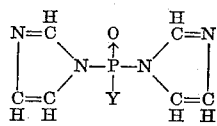

where Y is either a benzenoid hydrocarbyl or oxyhydrocarbyl radical containing from 6 to 12 carbon atoms, being free of olefinic and acetylenic unsaturation and linked through nuclear carbon to the remainder of the molecule, for example, phenyl, naphthyl, biphenyl, tolyl, xylyl, ethylphenyl, phenoxy, oxynaphthyl, oxybiphenyl, oxytolyl, oxyxylyl, oxyethylphenyl, etc., and (2) a dihydroxy aromatic compound of the formula HO—Z—OH where Z is an arylene radical containing 6 to 15 carbon atoms and is free of olefinic and acetylenic unsaturation, and where the hydroxyl groups are attached directly to the aromatic nucleus and are separated by at least three carbon atoms, for example, phenylene, naphthylene, biphenylene, etc. radicals and the hydroxy groups are attached directly to an aromatic nucleus and are separated by at least three carbon atoms.

With an aryl diimidazol-1-ylphosphinate, the reaction occurs substantially as follows:

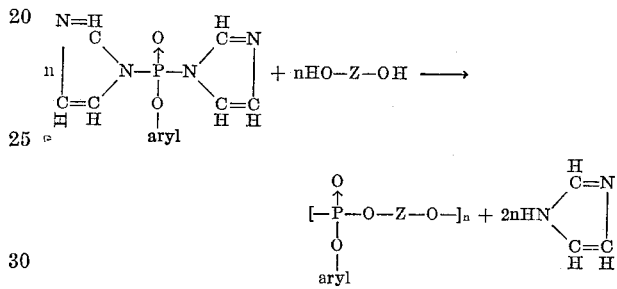

wherein aryl denotes an aromatic hydrocarbyl radical containing from 6 to 12 carbon atoms and being free of olefinic and acetylenic unsaturation, and Z has the meaning given above.

The aryl diimidazol-1-ylphosphinates are obtained by reaction of an aryloxyphosphoryl dihalide with imidazole as described by Cramer et al., Chem. Ber., 94, 1612 (1961).

With a diimidazol-1-ylarylphosphine oxide, the reaction takes place in the same manner; thus

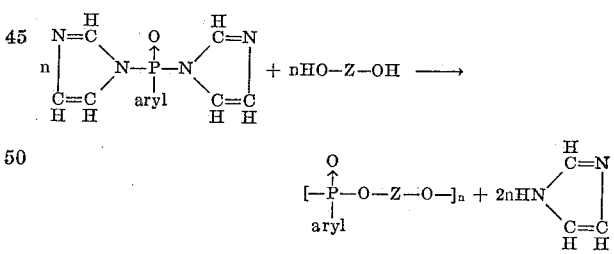

where aryl and Z have the meanings given above. The diimidazol-1-ylarylphosphine oxide is obtained by reaction of an aromatic hydrocarbylphosphonic dihalide with imidazole as described in our copending application Ser. No. 294,179, filed July 10, 1963.

Examples of presently useful aryl diimidazol-1-ylphosphinates are phenyl diimidazol-1-ylphosphinate, naphthyl diimidazol-1-ylphosphinate, biphenyl diimidazol-1-ylphosphinate, tolyl diimidazol-1-ylphosphinate, xylyl diimidazol-1-ylphosphinate, 2-, 3- or 4-ethyl-phenyl diimidazol-1-ylphosphinate, 2-, 3- or 4-hexylphenyl diimidazol-1-ylphosphinate, and 2-, 3- or 4-cyclohexylphenyl diimidazol-1-ylphosphinate.

Examples of presently useful diimidazol-1-ylarylphosphines oxides are diimidazol-1-ylphenylphosphine oxide, diimidazol-1-ylnaphthylphosphine oxide, diimidazol-1-ylbiphenylphosphine oxide, diimidazol-1-yltolylphosphine oxide, diimidazol-1-ylxylylphosphine oxide, diimidazol-1-yl-2-, 3- or 4-ethylphenylphosphine oxide, diimidazol-1-yl-2-, 3- or 4-hexylphenylphosphine oxide, and diimidazol-1-yl-2-, 3- or 4-cyclohexylphenylphosphine oxide.

Examples of the dihydroxy arylene compounds which react with the diimidazol-1-yl phosphorus compounds to give polymers include resorcinol, hydroquinone, 2,3'-, 2,4'-, 3,3'-, 3,4'- or 4,4'-dihydroxybiphenyl, 1,3-, 1,4-, 1,5-, 1,6-, 1,7-, 2,6-, 2,7-dihydroxynaphthalene, 4-hexylresorcinol and toluhydroquinone.

The reaction of the diimidazol-1-yl phosphorus compound with the dihydroxy arylene compound takes place, as shown in the above equations, with formation of the desired polymer and the production of imidazole as a by-product. The by-product imidazole so formed can be used for making a new supply of the diimidazol-1-yl phosphorus compound for the polymerization reaction.

Preparation of organic phosphorus polymers by the presently provided process takes place by simply heating the diimidazol-1-yl phosphorus compound with the dihydroxy compound at temperatures of from, say, 50° to 300° C., at ordinary, decreased or increased pressure and in the presence or absence of a liquid diluent or solvent. The reaction takes place readily in the absence of a catalyst; however, a catalyst, preferably basic, may be employed. The nature of solvent or diluent will depend upon the specific reactants which are used as well as upon the temperature and pressure conditions. Virtually any organic liquid which is inert under the reaction conditions may be used as diluent; and as will be obvious to those skilled in the art, a low boiling diluent generally will not be employed when the process is conducted at high temperatures or under substantially decreased pressure. Examples of useful diluents are pyridine, quinoline, dioxane, tetrahydrofuran, benzene, xylene, nitrobenzene, dimethylsulfoxide, dimethylformamide, etc. The use of a solvent will depend to some extent upon the nature of the reactants as well as upon the extent of heating. When one or both reactants are solids at moderately increased temperatures, a solvent will be generally useful; on the other hand, when the dihydroxy compound is a liquid or melts readily at the contemplated reaction temperature, a diluent need not be used unless the dihydroxy compound is extremely reactive. In that case, the use of an inert diluent will serve to moderate the reaction. As stated above, the temperature at which reaction is effected is variable; for here again must be taken into consideration the nature of the reactants, whether or not a catalyst and/or solvent or diluent is used and the pressure at which the reaction is conducted. Some of the present polymerizations can be conducted by gently warming, say, at temperatures of from 50° C. to 100° C. at ordinary atmospheric pressure. In other instances, heating of the reaction mixture at higher temperatures, say, at temperatures of from 100° C. to 250° C., and preferably at from 150° C. to 230° C. will be found to give optimum conversion. Operating in an inert atmosphere, e.g., nitrogen or argon, may be desirable, but not necessary. All of these variables, i.e., use of and nature of diluent, inert atmosphere, catalyst, temperature and pressure, can readily be arrived at by easy experimentation. Since reaction is evidenced by a change in viscosity, the extent of such change will be indicative of reaction. Very rapid reaction, as evidenced by rapid viscosity change will show the need for a diluent and/or lower temperature and/or shorter heating and/or no catalyst if one has been employed. Conversely, no reaction or only a very slow reaction will indicate the use of more extreme conditions. Thus, arrival at optimum reaction conditions is simply a matter of routine procedure by one skilled in the art. To assure complete reaction in experimental runs, it is generally recommended that the temperature of the reaction mixture be increased after the primary reaction has subsided. Completion of the reaction can then be ascertained by simply noting cessation in change of viscosity.

When the polymerization has been effected in the absence of a solvent or diluent and the reactants are employed in the stoichiometric proportions, generally the polymer is recovered from the reaction mixture by precipitating it with a non-solvent, whereby the by-product imidazole remains in solution. When the reaction is effected in the presence of a diluent which is a non-solvent for the polymer, the precipitated polymer is simply filtered off, washed and dried. When the reaction is conducted in a liquid which is a solvent for the polymer, the latter is separated from the reaction mixture by mixing with a liquid which is a non-solvent for the polymer. The by-product imidazole is generally much more soluble than the organic phosphorus polymer; this fact permits easy removal of the imidazole by washing.

To recapitulate: In the preparation of the organic phosphorus polymers, a diimidazol-1-yl phosphorus compound, being either an aryl phosphinate or an aryl phosphine oxide or a mixture of the same, is reacted with a dihydroxy arylene compound in the presence or absence of an inert diluent or solvent and in the presence or absence of a catalyst at a temperature which may be as low as, say, 50° C. and as high as, say, 300° C., at ordinary, increased or decreased pressure. To obtain high molecular weight, linear polymers, the diimidazol-1-yl-phosphorus compound and the dihydroxy arylene compound are employed in substantially stoichiometric proportions. An excess of either reactant can be employed, but the polymeric products produced thereby have much lower molecular weights; with large excess of one reactant polymers having only from say, 3 to 10 repeating units may be formed. There may be used a mixture of two or more aryl diimidazol-1-ylphosphinates, for example, phenyl diimidazol-1-ylphosphinate and 2-hexylphenyl diimidazol-1-ylphosphinate. Likewise, there may be used a mixture of diimidazol-1-ylarylphosphine oxides, for example, diimidazol-1-ylnaphthylphosphine oxide and diimidazol-1-ylxylylphosphine oxide. Likewise, there may be used a mixture consisting of any proportion of one or more aryl diimidazol-1-ylphosphinates and any proportion of one or more diimidazol-1-ylarylphosphine oxides to obtain polymers having various linkages dispersed more or less randomly in the polymer chain. There may also be used a mixture of dihydroxy aromatic compounds to obtain polymers having various linkages dispersed more or less randomly in the polymer chain.

The presently prepared linear polymers range from waxy to high-melting solids. Of particular importance, however, are those of the presently prepared linear polymers which are solid resinous materials. Such products are readily compression molded with heating to give molded objects which are tough, transparent and of good dimensional stability. The polymers may also be cast into films from solutions thereof or fibers may be prepared therefrom by extruding through a suitable orifice into a precipitating bath. Solutions of the solid polymers or the viscous polymers which are obtainable under some conditions by incomplete polymerization are useful as impregnating agents and adhesives in the manufacture of laminates, resin base coatings, i.e., paints, varnishes, lacquers and enamels.

The invention is further illustrated by, but not limited to, the following examples.

*Example 1*

A mixture consisting of 5.48 g. (0.02 mole) of phenyl diimidazol-1-ylphosphinate and 2.42 g. (0.022 mole) of resorcinol was heated with stirring under nitrogen to 250° C. in half an hour. The mixture was cooled to about 145° C., the reaction vessel was evacuated, and the by-product imidazole distilled out. The vessel and contents were further heated during this distillation step to 250° C., and were finally maintained at 250° C. for 30 minutes until no more imidazole appeared. The remaining product, which was solid at 250° C., was cooled and removed from the vessel as a somewhat rubbery polymer consisting of the repeating unit

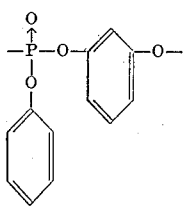

It did not liquefy up to 360° C. nor did it dissolve readily in hydrocarbons such as benzene or hexane nor in dimethylacetamide. The yield of polymer was substantially quantitative, there being obtained 4.94 g. compared with a theoretical yield of 4.96 g.

*Example 2*

A mixture consisting of 5.23 g. (0.0191 mole) of phenyl diimidazol-1-ylphosphinate, 2.18 g. (0.0198 mole) resorcinol and 10 ml. quinoline was heated with stirring under nitrogen to 195° C. in 45 minutes. The reaction vessel was then evacuated, and a mixture of quinoline and imidazole distilled out. The temperature of the vessel and contents were maintained at 200° C. for 30 minutes until no more imidazole appeared. The yield of polymers was substantially quantitative. By comparison with the product of Example 1, the polymer was a tough solid, softening below 50° C., and soluble in a warm mixture of quinoline and imidazole. On heating it appeared to pass through alternate stages of softening and hardening, being hard at 280° C. A coating applied from solution on stainless steel was glossy and, when heated, showed good adhesion after 8 hours in air at 800° F.

*Example 3*

A mixture consisting of 5.16 g. (0.02 mole) of diimidazol-1-ylphenylphosphine oxide and 2.20 g. (0.02 mole) of resorcinol was heated with stirring under nitrogen to 250° C. in 45 minutes. The mixture was cooled to about 145° C., the reaction vessel was evacuated, and the by-product imidazole distilled out. The vessel and contents were further heated during this distillation step to 253° C., and were finally maintained at 253° C. for 1 hour until no more imidazole appeared. The condensate contained no resorcinol by analysis. The yield of polymer was substantially quantitative. The polymer consisted of the repeating unit

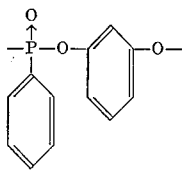

The polymer was very tough and had a softening point of about 69° C. The polymer was soluble in dimethyl acetamide. A coating applied from solution on stainless steel was adherent and glossy. Coatings applied to glass showed excellent adhesive properties.

*Example 4*

A polymer is prepared by heating a mixture consisting of equimolar quantities of diimidazol-1-ylphenylphosphine oxide and resorcinol as in Example 3, but using quinoline as a solvent and heating at 200° C. for 45 minutes. The resulting imidazole is then removed together with the solvent quinoline by distillation under vacuum. The polymer is obtained as a tough solid, readily soluble in a warm mixture of quinoline and imidazole.

The above examples are given by way of illustration only, and the present invention is not to be considered as limited by them. It will be obvious to those skilled in the art that many modifications can be made within the spirit of the invention, which is limited only by the terms of the appended claims.

What I claim is:

1. The method of preparing a polymer which comprises heating at 50° to 300° C. a phosphorus compound of the formula

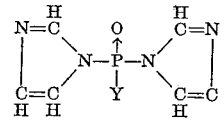

where Y is selected from the class consisting of (1) benzenoid hydrocarbyl radicals containing from 6 to 12 carbon atoms, being free of olefinic and acetylenic unsaturation and being linked through nuclear carbon to the remainder of the molecule, and (2) oxyhydrocarbyl radicals where hydrocarbyl is benzenoid containing from 6 to 12 carbon atoms and is free of olefinic and acetylenic unsaturation, with an arylene compound having the formula

HO—Z—OH where Z is an arylene radical containing 6 to 15 carbon atoms and is free of olefinic and acetylenic unsaturation, and where the hydroxyl groups are attached directly to the aromatic nucleus and are separated by at least three carbon atoms.

2. The method of preparing a polymer which comprises heating at 50° C. to 300° C. an aryl diimidazol-1-ylphosphinate of the formula

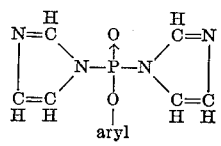

where aryl denotes an aromatic hydrocarbyl radical containing from 6 to 12 carbon atoms, being free of olefinic and acetylenic unsaturation and being linked through nuclear carbon to the remainder of the molecule, with an arylene compound having the formula

HO—Z—OH where Z is an arylene radical containing 6 to 15 carbon atoms and is free of olefinic and acetylenic unsaturation, and where the hydroxyl groups are attached directly to the aromatic nucleus and are separated by at least three carbon atoms.

3. The method of preparing a polymer which comprises heating at 50° C. to 300° C. a diimidazol-1-ylarylphosphine oxide of the formula

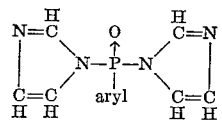

where aryl denotes an aromatic hydrocarbyl radical containing from 6 to 12 carbon atoms being free of olefinic and acetylenic unsaturation and being linked through nuclear carbon to the remainder of the molecule, with an arylene compound having the formula

HO—Z—OH where Z is an arylene raidcal containing 6 to 15 carbon atoms and is free of olefinic and acetylenic unsaturation, and where the hydroxyl groups are attached directly to the aromatic nucleus and are separated by at least three carbon atoms.

4. The method which comprises heating at 50° C. to 300° C. phenyl diimidazol-1-ylphosphinate with resorcinol to obtain a polyphenylene phosphate consisting essentially of the repeating unit

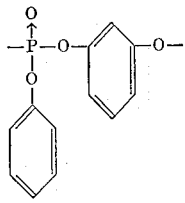

5. The method which comprises heating at 50° C. to 300° C. diimidazol-1-ylphenylphosphine oxide with resorcinol to obtain a polyphenylenephosphonate consisting essentially of the repeating unit

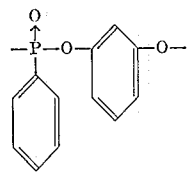

6. The method defined in claim 4, further limited in that the heating is conducted in the presence of an inert, organic liquid diluent.

7. The method defined in claim 5, further limited in that the heating is conducted in the presence of an inert, organic liquid diluent.

References Cited

UNITED STATES PATENTS

| | | | |
|---|---|---|---|
| 2,435,252 | 2/1948 | Toy | 260—47 |
| 2,636,876 | 4/1953 | Zenftman et al. | 260—61 |
| 3,244,647 | 4/1966 | Greenlee et al. | 260—2 |

OTHER REFERENCES

Penn, High Polymeric Chemistry, Chapman and Hall ltd., London 1949. p. 267–288 and 296–297 relied on.

D'Alelio, Fundamental principles of Polymerization, John Wiley & Sons, Inc. New York, 1952. pp. 213–214, 289 and 445 relied on.

WILLIAM H. SHORT, *Primary Examiner.*

M. GOLDSTEIN, *Assistant Examiner.*